United States Patent [19]

Müssig et al.

[11] Patent Number: 4,677,156

[45] Date of Patent: Jun. 30, 1987

[54] EASILY FLOWABLE, IMPACT RESISTANT POLYAMIDES

[75] Inventors: Bernhard Müssig, Seevetal; Rolf-Volker Meyer; Bert Brassat, both of Krefeld, all of Fed. Rep. of Germany

[73] Assignee: Bayer Aktiengesellschaft, Leverkusen, Fed. Rep. of Germany

[21] Appl. No.: 815,881

[22] Filed: Jan. 3, 1986

Related U.S. Application Data

[63] Continuation of Ser. No. 701,146, Feb. 13, 1985, abandoned, which is a continuation of Ser. No. 447,972, Dec. 8, 1982, abandoned.

[30] Foreign Application Priority Data

Dec. 19, 1981 [DE] Fed. Rep. of Germany ....... 3150453

[51] Int. Cl.$^4$ .......................................... C08F 283/04
[52] U.S. Cl. .................................. 525/425; 525/426; 525/430; 525/921; 525/925

[58] Field of Search .............. 525/425, 426, 430, 921, 525/925

[56] References Cited

U.S. PATENT DOCUMENTS 4,363,894 12/1982 Locatelli ............................ 525/426

FOREIGN PATENT DOCUMENTS 4711668 5/1969 Japan .
47-48520 12/1972 Japan .

Primary Examiner—Wilbert J. Briggs, Sr.
Assistant Examiner—Al Carrillo
Attorney, Agent, or Firm—Connolly & Hutz

[57] ABSTRACT

Easily flowable, impact resistant polyamide moulding composition containing from 0.5 to 10%, by weight, of polyethers preferably modified with (meth)acrylate or primary amino end groups or of polyesters preferably containing (meth)acrylate end groups.

7 Claims, No Drawings

EASILY FLOWABLE, IMPACT RESISTANT POLYAMIDES

This is a continuation of copending application Ser. No. 701,146 filed Feb. 13, 1985, now abandoned, which in turn was a continuation of application Ser. No. 447,972 filed Dec. 8, 1982, now abandoned.

This invention relates to highly fluid, impact-resistant polyamide moulding compounds containing from 0.5 to 10%, by weight, of end group modified polyethers or polyesters having molecular weights of from 500 to 10,000 and softening points below 100° C.

The impact strength of moulded products of polyamides depends to a large extent on the water content of the moulded products. In the anhydrous state, e.g. after production of the moulded products by injection moulding, those moulded products which have been produced from highly fluid and therefore easily processable polyamides of medium molecular weight, and among these especially those obtained from highly crystalline polyamides, are relatively sensitive to impact stresses.

Although moulded articles of relatively high molecular weight polyamides such as those preferably used for extrusion processing are less sensitive to impact, they are more difficult processed because of the substantially higher melt viscosity and the consequently lower fluidity of the polyamides used.

Moreover, the preparation of more highly viscous polyamides frequently requires a costly and elaborate solid phase-after-condensation step.

There is therefore a need for highly fluid polyamide moulding compounds which may be processed easily and from which moulded products having increased impact strength in the dry state can be produced. Of particular interest are those polyamides in which high tensile strength and ease of processing are combined with high impact strength.

Various methods for increasing the toughness of polyamides are known. These include, for example, the incorporation of low molecular weight plasticizers in the polyamides. This method fails to provide a satisfactory solution to the problem for various reasons. Most of the plasticizers which are suitable for synthetic materials are not sufficiently compatible with polyamides and migrate from the composition in the course of processing respectively tend to bleed out. On the other hand plasticizers which are compatible and form real solutions with polyamides in most cases impair the good mechanical properties of the polyamides. Highly polar, low molecular weight substances, such as water or dimethyl formamide do provide some improvement in the toughness of the polyamides, but they can be only incorporated into the polyamide moulded products after they have been formed because these additives have relatively low boiling points and thus would cause blisters in the articles.

This method is therefore generally too time-consuming and costly and unusable for the production of thick-walled moulded articles owing to the uneven distribution of the additives.

According to other methods the impact strength of polyamides is improved by the addition of certain polymeric substances. Thus, polyethylenes and copolymers of vinyl acetate and ethylene have been used with moderate success.

Better results have been obtained, for example, with olefinic copolymers containing COOH groups and with corresponding graft polymers.

This also applies to the modification with rubber polymers, e.g. with grafted acrylonitrile or polybutadiene rubber particles or with elastomeric blocks incorporated into the polamide by polycondensation. The toughness achieved, however, is not sufficient for certain applications.

Numerous attempts to prepare relatively high molecular weight polyamides without a solid phase after-condensation have been carried out with the aim of achieving chainbranching or cross-linking.

Polyfunctional epoxides, for example, and especially polyfunctional isocyanates are in principle suitable for this purpose.

These methods may indeed result in products having increased toughness but since the melt viscosity of the polyamide is usually also greatly increased processing by injection moulding may become very difficult.

It has now surprisingly been found that impact resistant, highly fluid polyamide moulding compounds which do not have the disadvantages mentioned above are obtained when polyamides are mixed with certain end group-modified polyethers and/or polyesters which have softening points below 100° C. The moulded products obtained from these compounds have substantially improved toughness which is comparable with that of polyamides having a considerably higher molecular weight.

It is surprising that the fluidity of the polyamide is not reduced by the modification, but remains substantially the same or is in many cases considerably improved. The fluidity may be adjusted by the type of modifier and by suitable choice of the flow length of the polyamide. The modification leaves the modulus of bending substantially unchanged.

The present invention therefore relates to easily flowable thermoplastically processible polyamide moulding compositions which contain from 0.5 to 10%, by weight, preferably from 2 to 6%, by weight, based on the polyamide, of at least one end group-modified polyether and/or polyester having a molecular weight of from 500 to $10^4$, preferably from $10^3$ to $5 \times 10^3$ and a softening point below 100° C.

Suitable end groups for the polyethers and polyesters are: residues of $\alpha,\beta$-unsaturated monocarboxylic acids, carbonic and oxalic acid esters, epoxides, primary and/or secondary amines, N-$\alpha$-hydroxymethyl lactams and similar compounds in which the polyether or polyester basis is not directly attached to the above-mentioned end groups, but, for example, by way of a polyurethane group.

The modifiers used are preferably polyesters and polyethers corresponding to the following general formula:

$$R-(X)_n$$

wherein
R represents a n-valent (poly)ether and/or (poly)ester group having an average molecular weight of from 500 to 10,000, preferably from 1000 to 5000; and
    n represents an integer from 1 to 4, preferably 2;
       when R represents a polyether radical, X represents one of the following groups $X_1$ to $X_8$;
    $X_1$ represents $-O-CO-CR^1=CH_2$ wherein $R^1$ represents H or $CH_3$;

$X_2$ represents —$NR^2H$ wherein $R^2$ represents H or $C_{1-18}$ alkyl;

$X_3$ represents —O—CO—O—$R^3$ wherein $R^3$ represents $C_{1-18}$ alkyl or optionally substituted aryl having from 6 to 19 carbon atoms;

$X_4$ represents —O—CO—CO—O—$R^3$; wherein $R^3$ is as defined above; $X_5$ represents

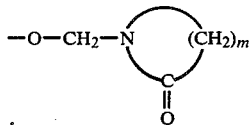

wherein m presents an integer of from 4 to 11;

$X_6$ represents

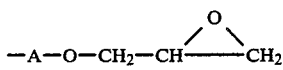

wherein A represents a bond or

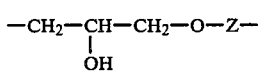

wherein
Z represents a (cyclo)aliphatic group having up to 10 carbon atoms, an aromatic $C_{6-16}$ group or an aliphatic aromatic $C_{7-18}$ group;
and the epoxide groups have optionally been reacted with (meth)acrylic acid or with hydroxyalkyl ($C_1$—$C_5$) (meth)acrylate;

$X_7$ represents

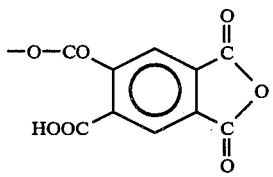

and
$X_8$ represents

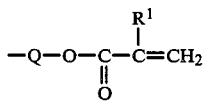

wherein
Q represents a polyurethane group.

The groups O—CO—$CR^1$=$CH_2$ and —$NR^2H$ are preferred. When R represents a polyester residue suitable end groups are $X_1$, $X_3$, $X_4$, $X_6$, preferably $X_1$ and $X_6$.

Methods of preparing the modifiers are known from the literature.

Modified polyethers are preferred, inter alia on account of the ease with which they may be dosed (viscosity) and the ease of preparation thereof.

It is particularly preferred to use polyethers having (meth)acrylate or primary amino end groups.

The molecular weights of the polyether and polyester groups indicated are determined from the OH number or amine number of the starting components. It is also possible to determine the molecular weight ($M_n$) by vapour-depression-or membrane-osmose-methods.

The polyamides used for the purposes of the present invention may be linear polycondensates of lactams or corresponding amino acids having from 4 to 12 carbon atoms or conventional polycondensates of diamines and dicarboxylic acids, such as 6,6-, 6,7-, 6,8-, 6,9-, 6,10-, 6,12-, 8,8- or 12,12-polyamide or polycondensates of aromatic dicarboxylic acids, such as isophthalic acid or terephthalic acid, with diamines, such as hexamethylene diamine or octamethylene diamine, or polycondensates of araliphatic starting materials, such as m- or p-xylylene diamines, and alipic acid, suberic acid or sebacic acid, and polycondensates based on alicyclic starting materials, such as cyclohexane dicarboxylic acid, cyclohexane diacetic acid, diamino-dicyclohexyl methanes or isophorone diamine.

Mixtures of the above-mentioned polyamides or copolyamides which may be obtained from the above-mentioned components may also be used. The softening points of the polyamides used as starting materials should be at least 150° C. Partially crystalline polyamides are preferably used.

The relative viscosity of the polyamides to be used should generally be at least 1.8 (determined in a 1% solution in m-cresol at 25° C.).

It is particularly preferred to use the 6,-, 6,6-, 6,9-, 6,10-, 6,12-, 11- and 12-polyamides conventionally used for the production of injection moulded articles, as well as copolyamides which are synthesized predominantly like the above-mentioned polyamides and have relative viscosities of from 1.8 to 5.0, preferably from 2.0 to 3.5 measured as indicated above.

Instead of polyamides, there may be used polymer blends which consist predominantely of polyamides, preferably to an extent of at least 70%, by weight, and further polymeric components which may consist mainly of known elastic polymers, such as a polyolefin or olefinic copolymer, preferably a copolymer containing polar groups, as well as corresponding graft (co)-polymers.

Products of this type are known and have been disclosed, e.g. in German Auslegeschrift No. 1,241,606 and German Offenlegungsschrift No. 2,758,568.

To prepare the modified polyamides according to the present invention, the polyamide component and the modifier may be mixed together at a temperature above the melting point of the polyamide. This may be carried out, for example, immediately after preparation of the polyamide, by mixing the modifier with the melt which is to be spun into a strand. The modified polyamides according to the present invention are preferably prepared by mixing the starting components in conventional mixing screws.

This method would be chosen particularly if, in addition to the polyamides, other polymers are to be incorporated for the preparation of modified polymer mixtures, or other additives, such as stabilizers, mould release agents, lubricants, crystallisation accelerators, plasticizers, pigments, dyes, reinforcing agents and/or fillers, such as glass fibres or asbestos, are to be incorporated.

For compounding the components, each conventional well known apparatus may be employed. Double screw extruders are preferred.

The polyamides which have been modified according to the present invention are easily flowable and can be therefore easily be processed into moulded articles in the conventional injection moulding machines. These moulded articles are distinguished by the improved notched impact strength as well as having the other advantageous properties typical of polyamides.

Moulded articles obtained from the polyamide moulding compositions according to the present invention may be more easily removed from the mould than unmodified products even if they do not contain special additives for this purpose, and they are also distinguished by very good surface characteristics.

I. PREPARATION OF THE MODIFIERS

EXAMPLE A 5.6 g of acrylic acid,
2100 g of an .ethylene oxide/propylene oxide copolyether tipped with ethylene oxide (OH number 28, bifunctional, iodine number 0 to 1, molecular weight $M_n$ about 4000),
18.5 g of p-toluene sulphonic acid dissolved in 18.5 g of water,
3.26 g of 2,5-di-t-butyl-hydroquinone,
2.16 g of p-methoxy-phenyl,
2.16 g of 2,6-di-t-butyl-4-methyl-phenol, about 900 g of toluene are boiled on a water separator at from 125° to 130° C. while air is slowly introduced. Toluene is distilled off when acid number 4 has been reached. The product is an almost colourless, low viscosity liquid of acid number 6.

EXAMPLES B-G

The following (meth)acrylate polyethers respectively polyesters (E) are prepared in a manner analogous to Example A:

B: Bis-acrylate of a polyethylene glycol having molecular weight of 200
C: Monoacrylate of a monofunctional propylene oxide/ethylene oxide copolyether (molecular weight 2800)
D: Bis-acrylate of polytetrahydrofuran (molecular weight 2000)
E: Bis-acrylate of a polyester diol having molecular weight 2000 obtained from dimeric fatty acid (Empol 1010 ®)/hexane diol
F: Bis-acrylate of a polyether of tetrahydrofuran and decene oxide (molecular weight 1750)
G: Bis-methacrylate of a propylene oxide/ethylene oxide copolyether, ethylene oxide-tipped (molecular weight 2000).

The molecular weights were calculated from the OH numbers of the mono- or poly-ols.

The products obtained from Experiments B to G are almost colourless to yellowish and the acid numbers are in the range of from 2 to 6. The products are easily dosable liquids having low viscosities with the exception of Example D, which is a solid product giving a highly fluid melt at above the temperature of about 37° C.

EXAMPLE H 1 kg of a bifunctional polyether diol based on propylene oxide and having a molecular weight of 2000, 1 kg of diethyl carbonate and 3 g of sodium methylate were heated to boiling with stirring. Ethanol was drawn off from the top of the column in the course of 20 hours and the diethyl-carbonate excess was subsequently removed under vacuum.

The residue was a low viscosity, pale liquid.

EXAMPLE K 1 kg of the polyether diol used in Example H is heated to boiling under stirring with 1 kg of diethyl oxalate and 3 g of sodium methylate.

Ethanol was drawn off at the top of the column in the course of 20 hours and the diethyl oxalate excess was subsequently removed under vacuum. The residue is a low viscosity, pale liquid.

EXAMPLE L 1 kg (0.5 mol) of a polyether (as used in Example G) was reacted with 148 g (1 mol) of phthalic acid anhydride for 5 hours. The product (acid number 60) together with 5.7 g of p-toluene sulphonic acid was slowly added dropwise to 380 g (1 mol) of bisphenol A-bis-glycidyl ether at 100° C. The end product had a residual acid number of 3.8 and is a medium viscosity liquid.

EXAMPLE M 1 kg (0.5 mol) of a polyether (as used in Example G), 158 g (1 mol) of N-methoxy-methyl caprolactam and 1 g of p-toluene sulphonic acid were together heated to 122° C. for 5 hours, 137° C. for 3 hours and 156° C. for 3 hours. Methanol was split off in the process. The residue is a brown liquid having a nitrogen content of 1.2%, by weight.

EXAMPLE N 1 kg (0.5 mol) of a polyether (as used in Example G) and 218 g (1 mol) of pyromellitic acid anhydride were heated to 120° C. within 1.5 hours and then stirred at 120° C. for one hour.

A medium viscosity liquid having an anhydride acid number of 41 and a free acid number of 96 was obtained.

II. PREPARATION OF THE MODIFIED POLYAMIDES

EXAMPLE 1

97 parts, by weight, of a 6-polyamide having a relative viscosity of 2.8 determined in a 1% solution in m-cresol at 25° C., a notched impact strength according to DIN 53453 of 2.37 $kJ/m^2$ and a flow length(*) of 65 cm and 3 parts by weight of the acrylate polyether of Example A are added separately into a double screw extruder (Model ZSK 53) using dosing balances or a dosing pump and extruded at 90 revs per min. and 260° C. The homogeneous melt is spun as a strand into a bath of water, granulated and dried at from 80 to 100° C. to a water content of less then 0.1%, by weight. The product has a relative viscosity of 2.73, a notched impact strength of 4.3 $kJ/m^2$ and a flow length of 74.5 cm. The flexural stress is 111 $N/mm^2$ (DIN 53 452).

(*) The flow length is a measure of the capacity of a product to flow and hence a measure of the ease with which it may be processed. A higher flow length means a better capacity to flow and hence shorter injection cycles. The flow length is determined as follows: The sample to be investigated is injected at a pressure of 72 bar, using an injection moulding machine at a cylinder temperature of 260° C., into a particular mould maintained at 90° C. Exceptionally easy flowing materials are capable of filling the mould under these conditions so that they may subsequently be removed as a spiral 100 cm in length. Less fluid materials only partly fill the mould under the conditions described, and due to premature solidification of the melt, only spirals less than 100 cm may subsequently be obtained. The flow length reproduced 5 times is given in centimeters.

EXAMPLE 2

Polyamide-6 is modified with 10%, by weight, of the acrylate polyether of Example A as described in Example 1. The results of measurements are entered in Table 1.

COMPARISON EXPERIMENT 1

The relative viscosity and the notched impact strength of a polyamide-6 are increased by conventional after-condensation, which is accompanied by a loss in flowability. The relevant properties are entered in Table 1.

COMPARISON EXPERIMENT 2

Polyamide-6 is prepared in an autoclave by conventional polycondensation, using acetic acid as chain-terminating agent. The polymer is easily flowable, but is not sufficiently tough for practical purposes, see Table 1.

EXAMPLE 3

Polyamide-6 having a rel. viscosity of 2,1 is extruded together with 6% of the acrylate polyether of Example A by the method described in Example 1. The results are summarized in Table 1.

EXAMPLES 4–6

The experimental procedure described in Example 1 is repeated, but the polyamide is also varied. The composition of the products and the properties thereof are summarized in Table 1. Polyamide-6,6 is extruded at 275° C.

EXAMPLE 13

67 parts, by weight, of the polyamide from Example 1, 30 parts, by weight, of commercial glass fibres and 3 parts, by weight, of the modifier of Example A are compounded as described in Example 1.
Properties of product:
Relative viscosity: 2.8
Flow length: 62 cm
Notched impact strength: 13.0 kJ/cm$^2$

COMPARISON EXPERIMENT 4

This is a repetition of Example 13 without the use of the modifier of Example A.
Properties of product:
Relative viscosity: 2.8
Flow length: 43 cm
Notched impact strength: 13.0 kJ/m$^2$

COMPARISON EXPERIMENT 5

The polyamide from Example 1 is treated with an isocyanate to increase the notched impact strength. The flow length of the polyamide is thereby shortened due to the increase in molecular weight. The results are summarized in Table 3.

TABLE 2

| | Modifier | | Modified polyamide | | |
|---|---|---|---|---|---|
| | Parts, by weight | Example type | $\eta_{rel}$ | $a_k$ (kJ/m$^2$) | Flow length (cm) |
| Comparison experiment 3 | 3 | B | 2.8 | 2.3 | 63 |
| Example 7 | 3 | C | 2.7 | 5.4 | 78 |
| Example 8 | 9 | C | 2.7 | 6.0 | 84 |
| Example 9 | 3 | D | 2.6 | 7.9 | 74 |
| Example 10 | 3 | E | 2.7 | 3.6 | 75 |
| Example 11 | 3 | F | 2.7 | 6.4 | 82 |
| Example 12 | 3 | G | 2.8 | 4.5 | 75 |

TABLE 1

| | Polyamide | | | | | Modifier | | Modified polyamide | | |
|---|---|---|---|---|---|---|---|---|---|---|
| | Type | $\eta_{rel}$ | Parts, by weight | $a_k$ (KJ/m$^2$) | Flow length (cm) | Example | Parts, by weight | $\eta_{rel}$ | $a_k$ (KJ/m$^2$) | Flow length (cm) |
| Example | | | | | | | | | | |
| 1 | 6-PA | 2.8 | 97 | 2.37 | 65 | A | 3 | 2.73 | 4.3 | 75 |
| 2 | 6-PA | 2.8 | 90 | 2.37 | 65 | A | 10 | 2.9 | 10.3 | 67 |
| 3 | 6-PA | 2.1 | 94 | 0.9 | 100 | A | 6 | 2.0 | 5.2 | 100 |
| 4 | 6,I-PA | 2.4 | 97 | 2 | 27 | A | 3 | 2.5 | 6.0 | 28 |
| 5 | 6,6-PA | 2.9 | 97 | 2.1 | 75 | A | 3 | 2.9 | 5.4 | 93 |
| 6 | 6,6-PA | 2.9 | 94 | 2.1 | 75 | A | 6 | 2.8 | 6 | 95 |
| Comparison example | | | | | | | | | | |
| 1 | 6-PA | 2.8 | 100 | 2.37 | 65 | — | 0 | 3.8 | 4.5 | 30 |
| 2 | 6-PA | 2.1 | 100 | 0.9 | 100 | — | 0 | — | — | — |

$a_k$ = notched impact strength according to DIN 53453 in the freshly injected state
6-PA = polycaprolactam
6,I-PA = polyhexamethylene isophthalamide
6,6-PA = polyhexamethylene adipamide

EXAMPLES 7–12

Polyamide-6 having a relative viscosity of 2.8 is extruded with various (meth)acrylate polyethers respectively polyesters according to the procedure described in Example 1. The properties of the modified polyamides determined are summarized in Table 2.

COMPARISON EXPERIMENT 3

Polyamide-6 is extruded as described in Example 1 with the modifier of Example B which has a low molecular weight of 200. The results are set forth in Table 2.

TABLE 3

| | Modifier | | Modifier polyamide | | |
|---|---|---|---|---|---|
| Comparison Experiment | Parts, by weight | Type | $\eta_{rel}$ | $a_k$ (kJ/m$^2$) | Flow length (cm) |
| 5 | 1 | H | 4.4 | 3.9 | 27 |

H = Desmodur VK ® (diphenyl-methane diisocyanate containing about 35% of polyfunctional multinuclear components)

EXAMPLE 14

97 parts, by weight, of the polyamide-6 described in Example 1 are compounded with 3 parts, by weight, of a polyether urethane acrylate of Example 7 of German Auslegeschrift No. 2,115,373.

Relative viscosity: 2.8
Flow length: 66 cm
Notched impact strength: 4.9 kJ/m$^2$

EXAMPLES 15 TO 20

Polyamide 6 is compounded as described in Example 1 with modifiers containing various end groups. Modifier P produces such a marked improvement in the flowability that the flow length amounts to 100 cm. Modification according to Examples H, K, L, M and N produce increases in flow length varying from slight to considerable. The results are shown in Table 4.

COMPARISON EXPERIMENT 6

Polyamide-6 is compounded, as described in Example 1, with the polyether diol used in Example H. A very slight improvement in the impact strength is accompanied by a considerable decrease in rigidity.

TABLE 4

| Modifier | | Modified polyamide product | |
| --- | --- | --- | --- |
| Type, according to Example | % by wt. | Notched impact Strength kJ/m$^2$ | Flexural stress N/mm$^2$ |
| Example | | | |
| 15 H | 3 | 7.3 | 112 |
| 16 K | 3 | 7.3 | 115 |
| 17 L | 3 | 5.2 | 115 |
| 18 M | 3 | 7.5 | 110 |
| 19 N | 3 | 6.3 | 110 |
| 20 P | 6 | 5.1 | — |
| Comparison experiment | | | |
| 6 Q | 3 | 3.4 | 95 |

Q = polyether diol as used for Example H
P = bis-(3-aminopropyl)-polytetrahydrofuran (Molecular weight 750)

COMPARISON EXPERIMENTS 7–10

For comparison with the products according to the present invention, polyethers having amino end groups were used together with a stoichiometric quantity of adipic acid as momonomers for the usual hydrolytic polycondensation of caprolactam. The products showed no improvement in the impact strength. Only products according to comparison experiment 10 showed a high notched impact strength, but the flowability and flexural strength thereof were insufficient. The products and the properties thereof are summarized in Table 5.

TABLE 5

| Comparison Experiment | Polyether used Type | % by wt. | Flexural strength (N/mm$^2$) | Notched impact strength (kJ/m$^2$) | $\eta_{rel}$ | Flow length (cm) |
| --- | --- | --- | --- | --- | --- | --- |
| 7 | I | 3 | 117 | 2.2 | 3.1 | 55 |
| 8 | II | 3 | 110 | 2.3 | 2.8 | 57 |
| 9 | II | 6 | 108 | 2.1 | 2.8 | 46 |
| 10 | II | 10 | 88 | 8.3 | 3.1 | 24 |

I = polytetrahydrofuran having 3-aminopropyl end groups, molecular weight = 1100
II = polypropylene oxide-polyether with OH end groups replaced by NH$_2$, molecular weight = 2000

We claim:

1. Highly fluid, thermoplastically processable polyamide moulding composition which comprises a mixture containing a polyamide and a polyamide modifier, said mixture being prepared by mixing the polyamide component and the modifier component at a temperature above the melting point of the polyamide in mixing screws, wherein the modifier component is from 0.5 to 10%, by weight, of at least one end group modified polyether and/or polyester having a molecular weight of from 500 to 10$^4$ and a softening point <100° C., corresponding to the following general formula:

$$R\text{—}(X)_n$$

wherein
R represents a n-valent (poly)ether residue or (poly)ester residue having an average molecular weight of from 500 to 10,000;
n represents an integer from 1 to 4; and
X represents one of the following groups $X_1$ to $X_7$ when R represents a polyether residue;
$X_1$ is —Q—O—CO—CR$^1$=CH$_2$ wherein R$^1$ represents H or CH$_3$ and Q is a single bond, a polyepoxide moiety or a polyurethane moiety;
$X_2$ is —NR$^2$H wherein R$^2$ represents H or C$_{1-18}$ alkyl;
$X_3$ is —O—CO—O—R$^3$ wherein R$^3$ represents C$_{1-18}$ alkyl or substituted or unsubstituted aryl having from C$_6$-C$_{19}$;
$X_4$ is —O—CO—CO—O—R$^3$ wherein R$^3$ is as defined in $X_3$;
$X_5$ is

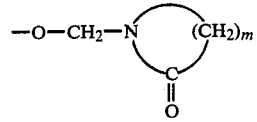

wherein m is 4–11;
$X_6$ is

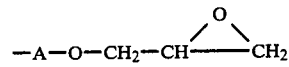

wherein A represents a bond or

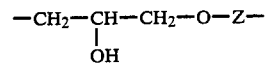

wherein
Z represents a (cyclo)aliphatic C$_{1-10}$ group, an aromatic C$_{6-16}$ group or an aliphatic-aromatic C$_{7-18}$ group; and $X_7$ is

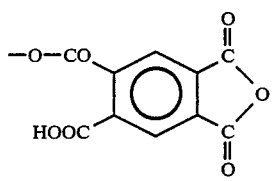

and when R represents a (poly)ester residue, X represents one of the following groups: $X_1$, $X_3$, $X_4$ or $X_6$, with the proviso that $X_1$ is not a polyurethane moiety.

2. Compositions as claimed in claim 1 comprising from 2 to 6%, by weight, of at least one end group-modified polyether and/or polyester.

3. Compositions as claimed in claim 1 comprising at least one end group-modified polyether and/or polyester having a molecular weight of from 1000 to 5000.

4. Compositions as claimed in claim 1, wherein the polyether has $-O-CO-CR^1=CH_2$ or $-NR^2H$ end groups and the polyester has $X_1$ or $X_6$ end groups.

5. Compositions as claimed in claim 4 wherein a polyether with (meth)acrylate or primary amino end groups is used.

6. Compositions as claimed in claim 1, wherein the polyamide is an aliphatic polyamide.

7. Compositions as claimed in claim 6, wherein the polyamide is polyamide-6 or polyamide-6,6 optionally blended with up to 30% by weight of an elastomeric polymer.

* * * * *